(12) United States Patent
Cunningham et al.

(10) Patent No.: US 6,231,047 B1
(45) Date of Patent: May 15, 2001

(54) BRUSH SEAL

(75) Inventors: Matthew D. Cunningham, Lakeville, MA (US); Robert P. Menendez, Exeter, RI (US); James A. Henderson, Greenfield, WI (US); Chih-Yuan Shia, Germantown, WI (US); William J. Casey, Whitefish Bay, WI (US); William W. Smith, Jr., Milwaukee, WI (US)

(73) Assignees: EG&G Engineered Products, Warwick, RI (US); Pferd Milwaukee Brush Co., Inc., Menomonee Falls, WI (US)

( * ) Notice: Subject to any disclaimer, the term of this patent is extended or adjusted under 35 U.S.C. 154(b) by 0 days.

(21) Appl. No.: 09/087,243

(22) Filed: May 29, 1998

(51) Int. Cl.⁷ .................................................. F16J 15/447
(52) U.S. Cl. ............................................................ 277/355
(58) Field of Search .............................................. 277/355

(56) References Cited

U.S. PATENT DOCUMENTS

| | | |
|---|---|---|
| Re. 30,206 * | 2/1980 | Ferguson et al. ..................... 277/355 |
| 885,032 | 4/1908 | De Ferranti . |
| 2,878,048 * | 3/1959 | Peterson ............................... 277/355 |
| 4,202,554 | 5/1980 | Snell . |
| 4,204,629 | 5/1980 | Bridges . |
| 4,274,575 | 6/1981 | Flower . |
| 4,398,078 | 8/1983 | Flower . |
| 4,411,594 | 10/1983 | Pellow et al. . |
| 4,457,515 | 7/1984 | Eidschun . |
| 4,595,207 | 6/1986 | Popp . |
| 4,600,202 | 7/1986 | Schaeffler et al. . |
| 4,642,867 | 2/1987 | Hough et al. . |
| 4,678,113 | 7/1987 | Bridges et al. . |
| 4,730,876 | 3/1988 | Werner et al. . |
| 4,756,536 | 7/1988 | Belcher . |
| 4,781,388 | 11/1988 | Wohrl et al. . |
| 4,809,990 | 3/1989 | Merz . |
| 4,839,997 | 6/1989 | Pritchard . |
| 4,843,421 | 6/1989 | Fox . |
| 4,884,850 | 12/1989 | Greer . |
| 4,934,759 | 6/1990 | Bridges . |
| 4,971,336 | 11/1990 | Ferguson . |
| 5,090,710 | 2/1992 | Flower . |
| 5,106,104 * | 4/1992 | Atkinson et al. ..................... 277/355 |
| 5,135,237 * | 8/1992 | Flower . |
| 5,165,758 | 11/1992 | Howe . |
| 5,176,389 * | 1/1993 | Noone et al. ........................ 277/355 |
| 5,183,197 | 2/1993 | Howe . |
| 5,335,920 * | 8/1994 | Tseng et al. . |
| 5,351,971 * | 10/1994 | Short ................................... 277/355 |
| 5,401,036 | 3/1995 | Basu . |
| 5,474,305 * | 12/1995 | Flower ................................. 277/355 |
| 5,688,105 * | 11/1997 | Hoffelner . |
| 5,704,760 | 1/1998 | Bouchard et al. . |
| 5,799,952 * | 9/1998 | Morrison et al. .................... 277/355 |
| 5,884,918 * | 3/1999 | Basu et al. ........................... 277/355 |

FOREIGN PATENT DOCUMENTS

| | | | |
|---|---|---|---|
| 2344666 * | 3/1974 | (DE) ................................... 277/355 |
| 2214998 * | 9/1989 | (GB) . |

* cited by examiner

*Primary Examiner*—B. Dayoan
*Assistant Examiner*—John L. Beres
(74) *Attorney, Agent, or Firm*—Iandiorio & Teska (57) ABSTRACT

A brush seal includes a retainer and a multiplicity of single bristles each bristle having a fixed end and a free sealing end, the fixed ends being individually attached in a continuous arrangement at the same angle to the retainer, the bristles having a uniform pack density throughout the extent of the bristles from the fixed to the sealing end.

24 Claims, 10 Drawing Sheets

BRUSH SEAL

FIELD OF INVENTION

This invention relates to an improved brush seal, and more particularly to such a brush seal which has uniform pack density throughout the extent of the bristles.

BACKGROUND OF INVENTION

Presently there are a number of techniques for making a brush seal using a plurality of tufts of bristles. In one technique the bristles are gathered at one end into a tuft; the tufted end of a plurality of such tufts are embedded in series in an epoxy retainer or rail. The rail is bent into an annular shape with the unattached ends of the tufts extending radially outwardly and across a back plate. A front plate is attached with unattached ends of the tufts sandwiched between the plates. The unattached ends of the bristles are trimmed and attached as by welding at the O.D. of the back plate and become the fixed ends of the bristles in the seal while the tufted ends of the bristles are trimmed off beyond the I.D. and become the free sealing ends of the bristles which ride on a shaft for example. The tufts of bristles are oriented with the tufted ends radially inwardly and the bristles spread with increasing radius. This makes the bristles non-parallel and makes their pack density (number of bristles per in$^2$) non-uniform; this introduces a number of problems. Since the bristles are not uniformly distributed there is inconsistent wear and inconsistent leakage with resulting reduced life and performance. The non-uniform density produces weak spots where the fluid being sealed may tunnel through and cause leakage. Bristle blow down can occur where air or other fluid turns downward at the seal toward the shaft and displaces the bristles causing gaps and leakage and increased uneven wear. In another technique the tufts of bristles are positioned in slanted radial grooves on an annular jig with the tufted ends being radially outward and the unattached ends being radially inward. A retainer such as a back plate fits within the center hole of the annular jig so that the tufts extend slanted radially across it. The tufts are fixed to the back plate typically with a front plate and welding and the tufted ends are trimmed off at the O.D. of the back plate. The unattached ends of the tufts are trimmed off radially inwardly of the I.D. of the back plate. In this latter technique in contrast to the former, the tufted ends become the fixed end of the bristles while the unattached ends become the free sealing ends of the bristles. But the same non-uniform pack density results with the same problems in performance, wear, life and leakage including tunnelling and bristle blow down. In both approaches, since tufts have a predetermined size, unique tufts must be manufactured for different I.D. seals. This is so because as more and more of the bristles toward the O.D. are trimmed off to enlarge the I.D. of the seal, the pack density decreases until a practical seal is no longer possible.

SUMMARY OF INVENTION

It is therefore an object of this invention to provide an improved brush seal.

It is a further object of this invention to provide such an improved brush seal that has uniform pack density throughout the extent of the bristles.

It is a further object of this invention to provide such an improved brush seal which is simpler and less expensive.

It is a further object of this invention to provide such an improved brush seal which has improved wear, life, performance and sealing.

It is a further object of this invention to provide such an improved brush seal which reduces effects of tunnelling and bristle blow down.

It is a further object of this invention to provide such an improved brush seal which is modular and provides the same uniform pack density independent of the seal radial cross-section.

The invention results from the realization that a truly improved brush seal can be achieved by individually attaching a multiplicity of single bristles to the retainer at the same angle in a continuous array so that the bristles have a uniform pack density throughout their entire extent from the fixed end to the sealing end.

This invention features a brush seal including a retainer and a multiplicity of single bristles each bristle having a fixed end and a free sealing end. The fixed ends are individually attached in a continuous array at the same angle to the retainer. The bristles have a uniform pack density throughout the extent of the bristles from the fixed to the sealing end.

In a preferred embodiment the retainer may include a retainer element or a pair of spaced retainer elements with the bristles between them. The retainer element may include a weld or a braze or an epoxy element for attaching the bristles to the retainer. The retainer element may include a backing plate and/or a front plate. The retainer element may be a flexible member. The flexible member may have a moment of inertia of approximately $5 \times 10^{-5}$ or in$^4$ or less. The angle of the bristles may be between 30° and 90°. The retainer may be linear, curved or annular. The bristles may be a metal alloy such as a cobalt based metal alloy, Haynes 25, Haynes 214 or stainless steel. The retainer may be a metal alloy such as a nickel-based metal alloy including Inconel 625.

The invention also features an annular brush seal including an annular retainer and a multiplicity of single radially extending bristles each having a fixed end and a free sealing end. The fixed ends are individually attached in a continuous array at the same angle to the retainer. The bristles have a uniform pack density throughout the radial extent of the bristles from the fixed end to the sealing end.

The invention also features a linear brush seal including a linear retainer and a multiplicity of single parallel bristles each having a fixed end and a free sealing end. The fixed ends are individually attached to the retainer at the same angle in a continuous array. The bristles have a uniform pack density throughout the parallel extending bristles from the fixed to the sealing end.

DISCLOSURE OF PREFERRED EMBODIMENT

Other objects, features and advantages will occur to those skilled in the art from the following description of a preferred embodiment and the accompanying drawings, in which.

Figure 1:
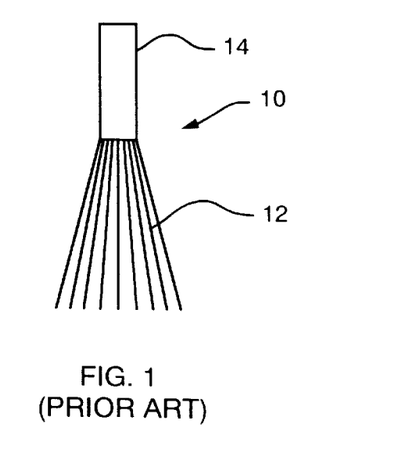
FIG. 1 is a diagrammatic side elevational view of a tuft of bristles in accordance with the prior art.
Figure 2:
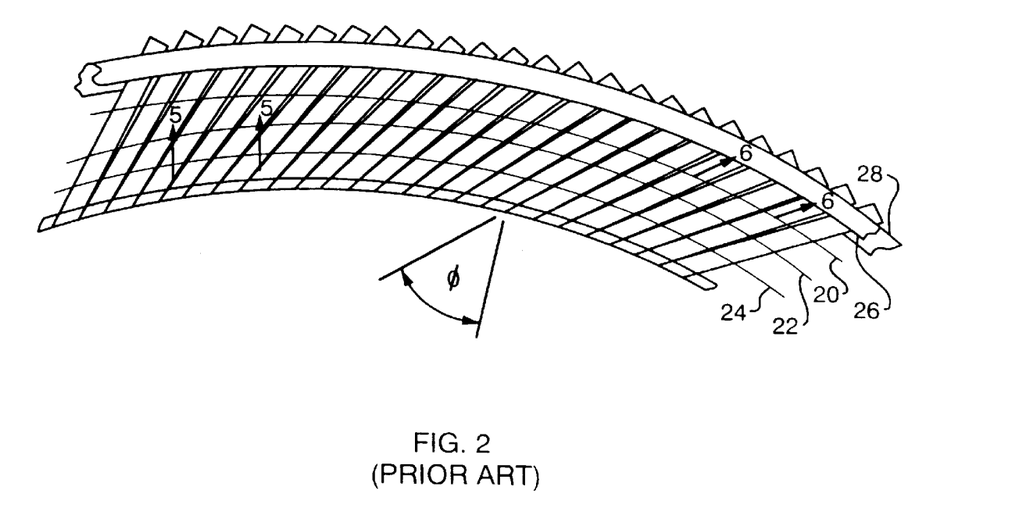
FIG. 2 is a side elevational schematic diagram showing the installation of a number of tufts such as shown in FIG. 1 with a retainer.
Figure 3:
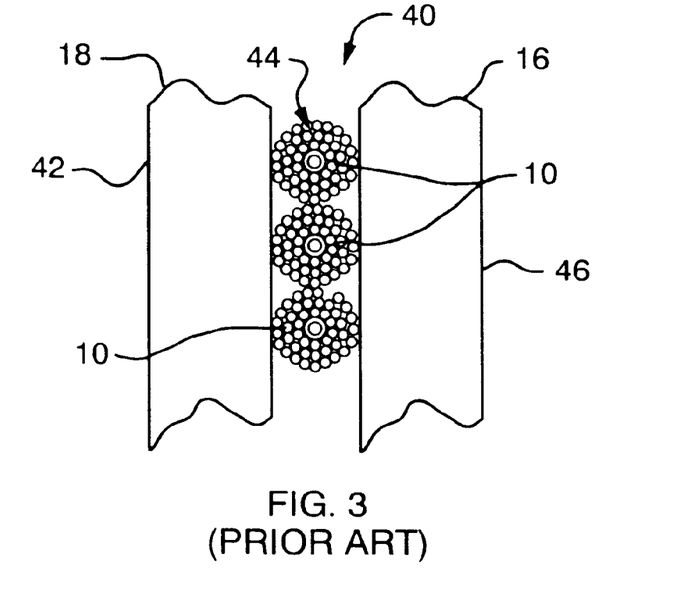
FIG. 3 is a sectional view taken along line 3—3 of FIG. 2 showing the circular shape of the tufts before they are squeezed between a pair of curved retaining elements.
Figure 4:
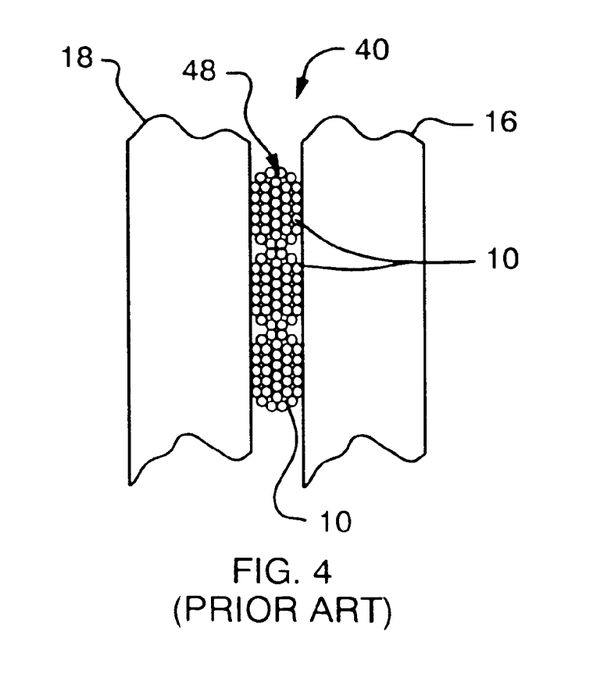
FIG. 4 is a view similar to FIG. 3 showing the tufts after they are compressed between a pair of retaining elements.

There is shown in FIG. 1 a prior art tuft 10 made up of a plurality of bristles 12 which are attached together at one end 14 such as by a weld or braze, an adhesive such as epoxy, or a mechanical sheath, not shown. Typically tufts 10 are held between retainer elements 16 and 18, FIG. 3, so the nominal angle φ, defined in FIG. 2, of the tuft bristles is observed as shown in FIG. 3 and then retainer elements 16, 18 are squeezed together tightly to compress tufts 10 as shown in FIG. 4 in order to make their distribution more uniform. That angle φ can be typically between 30° and 90°. Once attached together, the tufts 20 are wrapped about a mandrel or fixtured in a jig. In the case of the mandrel, the fixed end of each tuft is oriented inward while the free end extends radially outward at a defined angle, φ. As shown in FIG. 2, a curved front plate 22 and a curved back plate 24 are positioned on either side of the outwardly arranged tufts. The tufts are compressed between the front and back plates, at which time the compression displaces the bundle of bristles at the free end 26. It is this displacement of circular tufts into a wedge shaped geometry of larger area which introduces a non-uniform distribution of bristles. At this juncture, the pack density, expressed as number of bristles per square inch area, varies from ID to OD. The pack density is highest at the ID and decreases accordingly from ID to OD.

Figure 5:
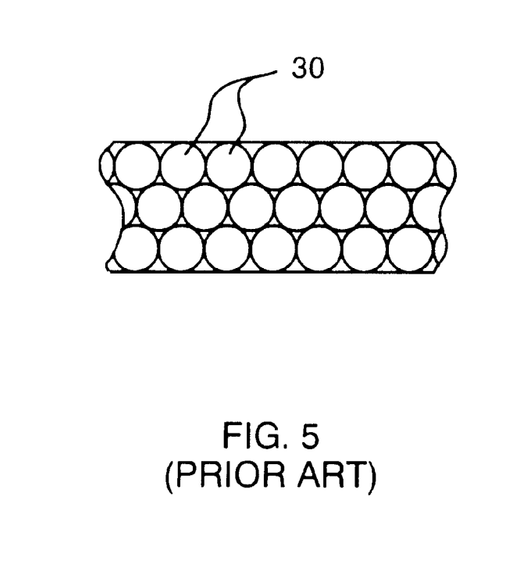
FIGS. 5 and 6 are views taken along lines 5—5 and 6—6 of FIG. 2 showing the non-uniform pack density of the prior art tufts.
Figure 6:
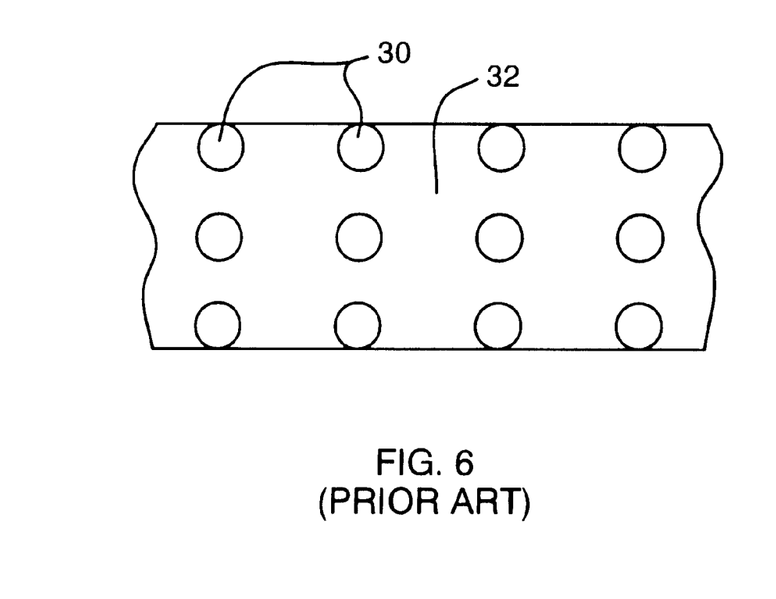

But even though this does improve the uniformity it does not make it truly uniform. That is, a cross-section at line 20, FIG. 2, would show a much lower pack density than a cross-section at line 22 and the highest pack density would be at line 24. Pack density is expressed as no. bristles/in². This can be seen more clearly in FIGS. 5 and 6 where FIG. 5 is a cross-sectional view taken along lines 5—5 of FIG. 2 closer to the fixed end of tufts 10 whereas FIG. 6 is a cross-sectional view taken along line 6—6 closer to the free sealing end of the tufts 10. From these it can be seen that the pack density and the voids between the bristles are much greater in FIG. 6 than in FIG. 5. In FIG. 5 individual bristles 30 are shown packed tightly together whereas in FIG. 6 bristles 30 have significant space 32 between them.

Figure 7:
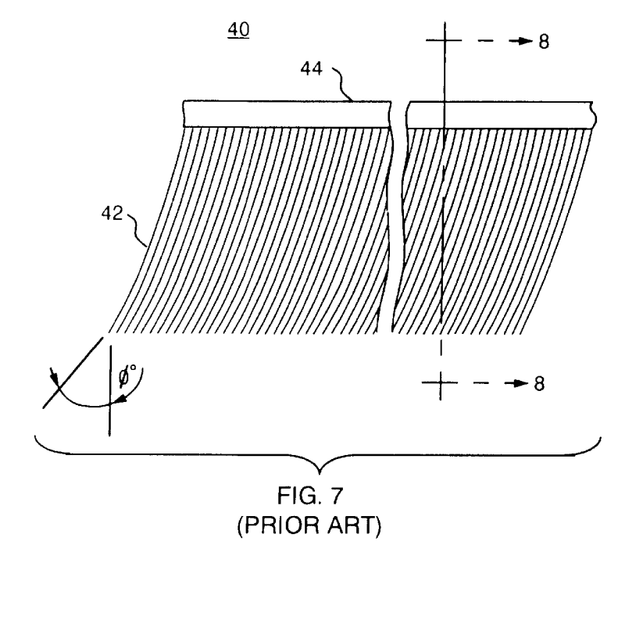
FIG. 7 is a side elevational view of a prior art linear brush seal showing the spreading non-uniform pack density.
Figure 8:
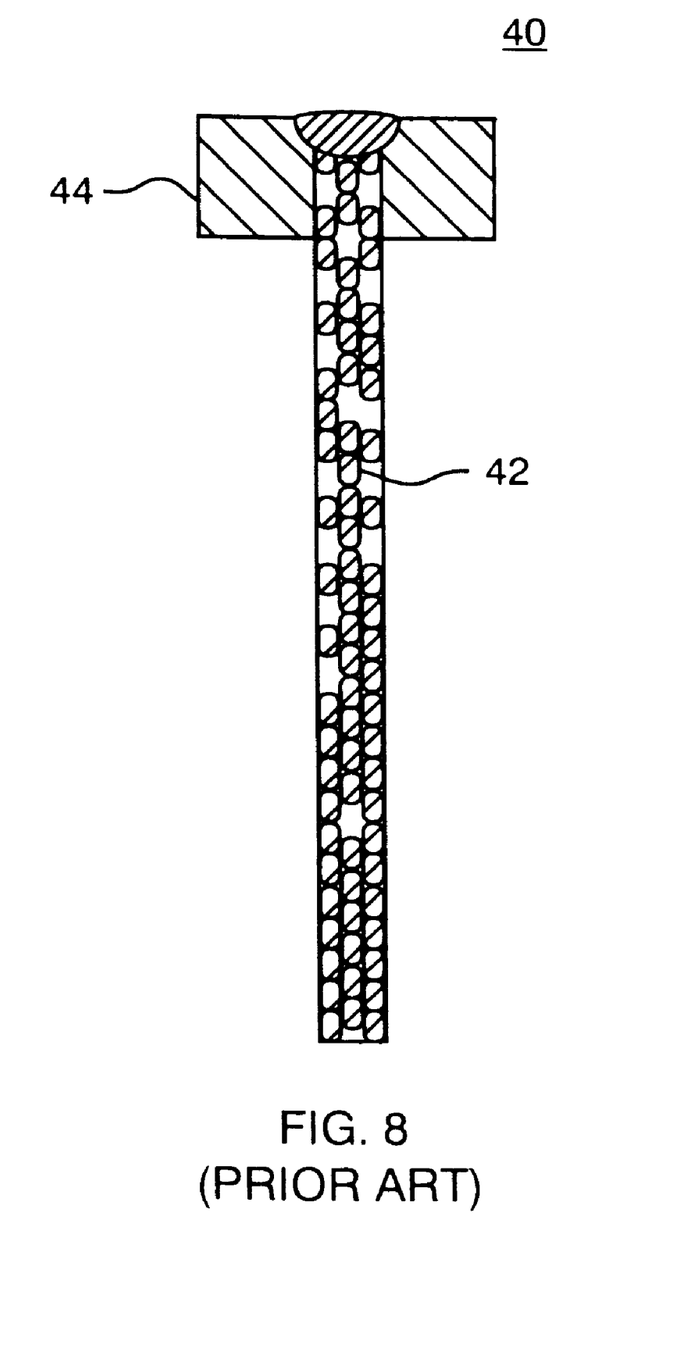
FIG. 8 is a cross-sectional view taken along line 8—8 of FIG. 7.

A finished prior art brush seal 40, FIG. 7, shown as a straight brush seal has some uniformity but not sufficient to meet all needs as the bristles 42 spread more and more as the distance from the retainer 44 increases. The result is the voids and non-uniformity as depicted in FIG. 8 which is a cross-section taken along line 8—8 of FIG. 7.

Figure 9:
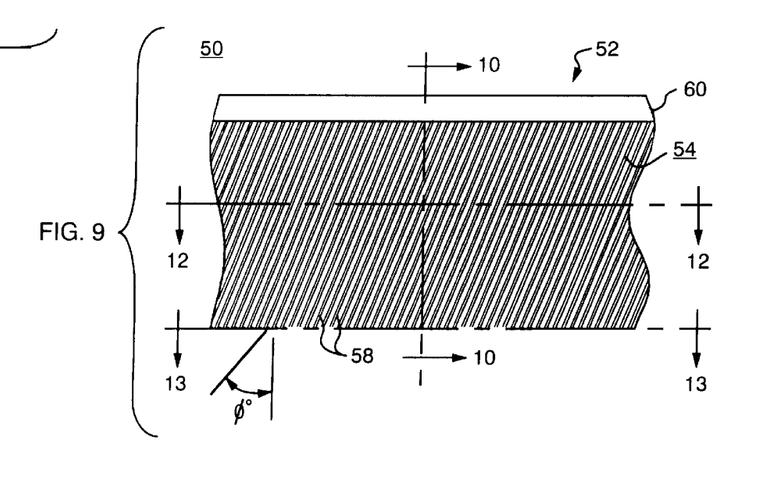
FIG. 9 is a side elevational schematic diagram of a linear brush seal according to this invention.
Figure 12:
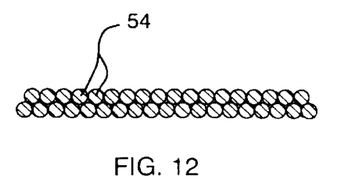
FIGS. 12 and 13 are cross-sectional views taken along lines 12—12 and 13—13 of FIG. 9 showing the uniform pack density of the bristles throughout their extent from the free sealing end to the fixed end.
Figure 13:
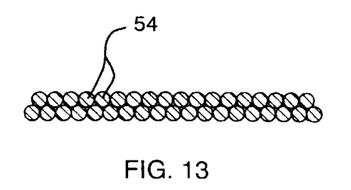

In accordance with this invention a brush seal such as a linear brush seal 50, FIG. 9, is made using a retainer 52 to which a multiplicity of single bristles 54 are attached. Each bristle has a fixed end 56 and a free sealing end 58. The fixed ends are individually attached in a continuous array at some angle θ to the retainer 52 and the bristles have a uniform packing density throughout the extent of the bristles from the fixed 56 to the sealing 58 end. In this particular embodiment, retainer 52 may include a conventional front plate 60 and back plate 62, FIG. 10, without the use of any intermediate retainer elements. Plates 60, 62 may be engaged with each other and the bristles by any suitable means, e.g., welding, brazing, epoxy. The uniform pack density of the bristles 54 can be seen to greater advantage in FIG. 10 which is a cross-sectional view taken along line 10—10 of FIG. 9. The uniformity is also displayed in FIG. 11 which is a top plan view of brush seal 50 of FIG. 9 where the uniform pack density of the fixed ends can be seen. The uniform distribution or pack density from the free sealing ends 58 to the fixed ends 56 of the bristles 54 is also illustrated by comparing the cross-sectional views of FIGS. 12 and 13 taken along lines 12—12 and 13—13 of FIG. 9, respectively, which show the tight uniform packing density of the bristles at both positions.

Figure 10:
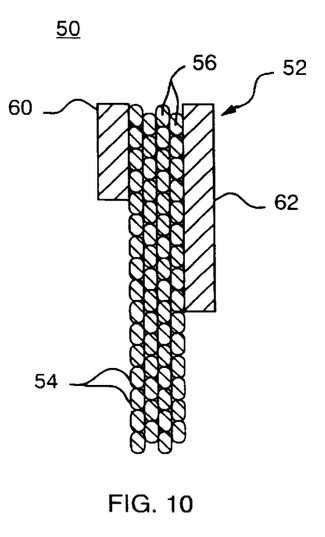
FIG. 10 is a cross-sectional view taken along line 10—10 of FIG. 9 again showing the uniform pack density of the bristles.
Figure 14:
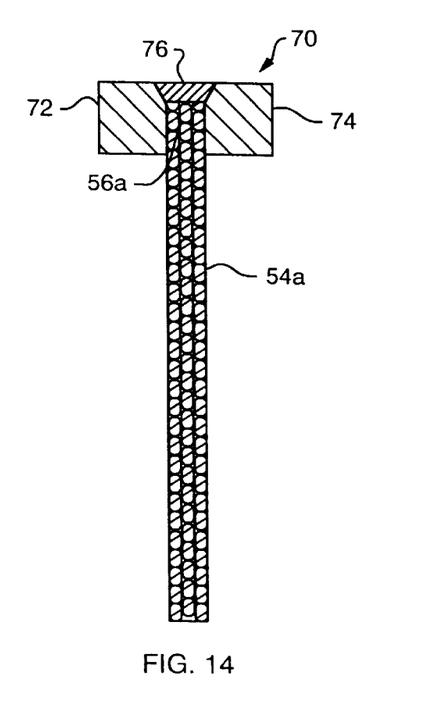
FIG. 14 is a view similar to FIG. 11 but showing the bristles attached to a retainer element with a weld or braze bead instead of directly to front and back plates.
Figure 15:
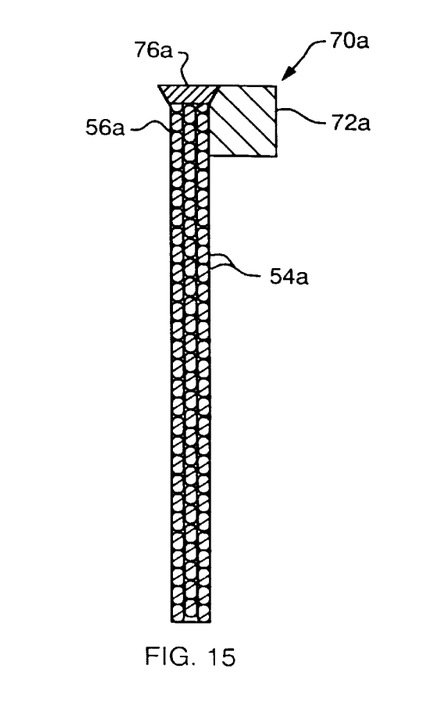
FIG. 15 is a view similar to FIG. 14 wherein the retainer includes but a single retainer element.

While in FIG. 10 the retainer is implemented by conventional front and back plates 60 and 62, this is not a necessary limitation of the invention. As shown in FIG. 14, bristles 54a may have their fixed ends attached to a more conventional retainer element 70 which then may be attached in a variety of ways to the conventional back plate or front and back plate configuration. Retainer element 70 in FIG. 14 actually has two retainer elements 72 and 74 and the fixed ends 56a of bristles 54a are attached by a welded or brazed bead 76. A retainer element 70a, FIG. 15, may include a single retainer element 72a.

Figure 11:
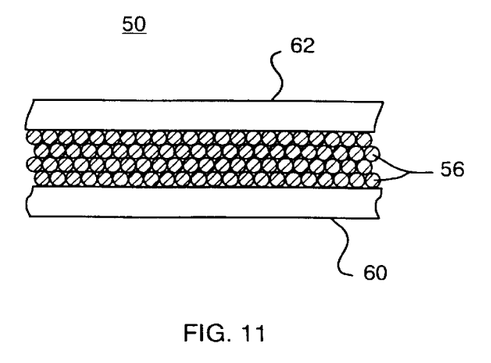
FIG. 11 is a top plan view of the brush seal of FIG. 9 showing the uniform distribution of the bristles at their fixed end.
Figure 16:
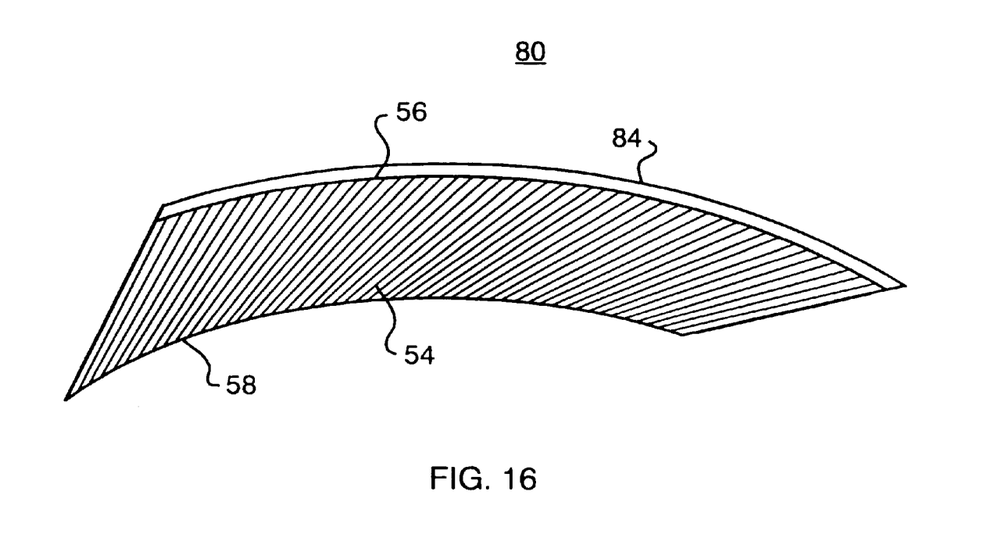
FIG. 16 is a diagrammatic side elevational view of a curved brush seal according to this invention.
Figure 17:
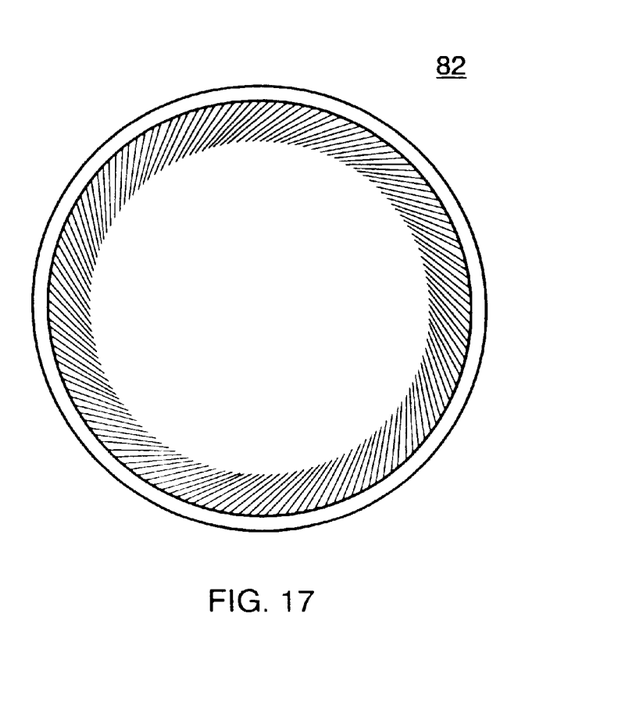
FIG. 17 is a view similar to FIG. 16 of an annular brush seal according to this invention.
Figure 18:
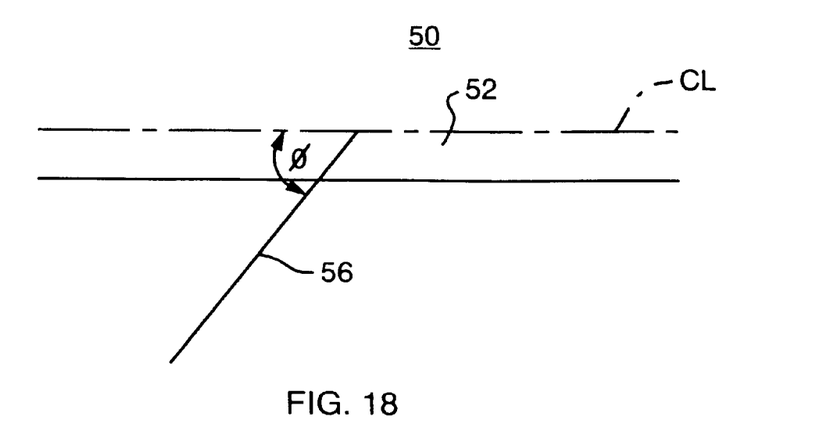
FIGS. 18 and 19 illustrate the procedure for measuring the angle of the bristles in straight and curved brush seals, respectively.

While the brush seal 50 of FIGS. 9–11 is shown as a straight seal, this is not a necessary limitation of the invention. For example, the seal may be made as a curved seal 80, FIG. 16, or an annular seal 82, FIG. 17. In fact the curved seal 80 may be formed into the annular seal 82 or the annular seal 82 may be made originally. The retainer 84 in FIG. 16 and retainer 86 in FIG. 17 may be made of flexible material having a moment of inertia of approximately $5 \times 10^{-5}$ in.$^4$ or less. The retainer may be a metal alloy. The metal alloy may be an iron-based metal alloy such as 410 s.s or may be Inconel 625. The bristles may also be a metal alloy, for example, a cobalt-based metal alloy such as Haynes 25. The bristles may also be made of Haynes 214 or any other material suitable for the sealing application.

Figure 19:
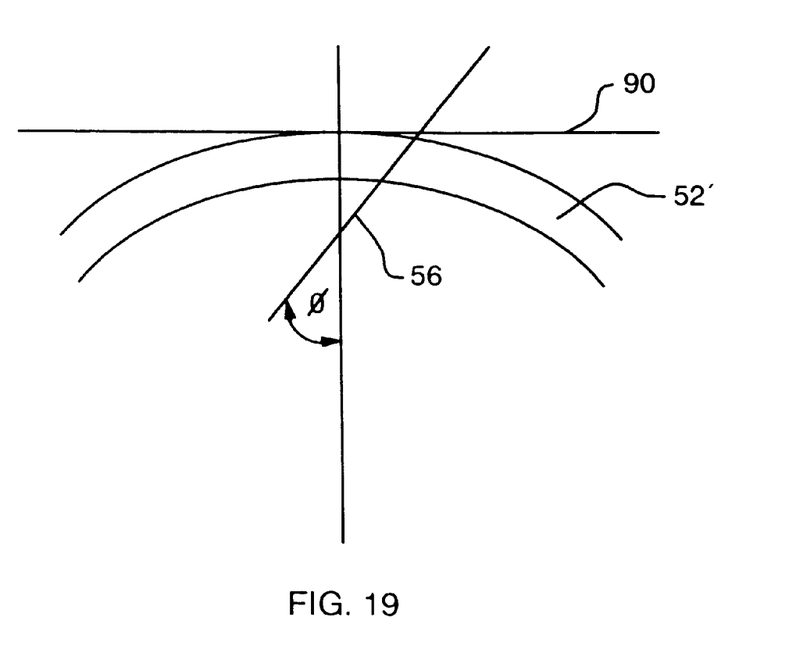
Figure 20:
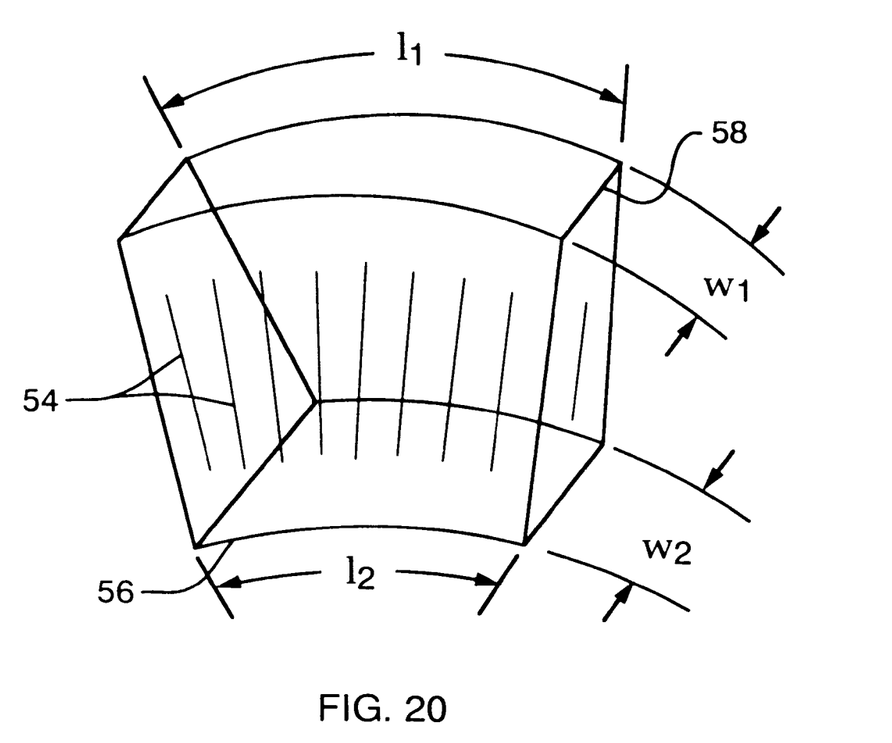
FIG. 20 is a diagrammatic illustration showing that even in a curved brush seal the pack density remains constant.

The angle θ of the bristles referred to in FIG. 9, which may be between 30° and 90°, is determined in straight seals as the angle between the center line of the retainer 52 and the bristles 56. In a curved seal or annular seal, FIG. 19, the angle θ is the angle between the bristles 56 and the tangent line 90 to the curved retainer 52'. When a curved seal is made the compression of the bristles makes the free end of the bristles squeeze closer together while in the axial dimension they expand. Nevertheless, with the seal of this invention the pack density remains uniformly the same. This can be seen in FIG. 20 where a section of the circular brush seal is shown to have a circumferential length $l_1$, at the fixed end 58 and a much shorter distance $l_2$ due to the compression at the free sealing end 56. In contrast, the width in the axial direction $w_1$, at the fixed end 58 is smaller than the width $w_2$ in the axial direction at the free sealing end 56. However, the overall area has not changed in the seal according to this invention. The overall product $l_1 w_1$ equals $l_2 w_2$. The pack density or the number of bristles per square inch remains the same.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A brush seal comprising:

a retainer; and a multiplicity of single bristles each bristle having a fixed end and a free sealing end, said fixed ends being individually attached in a continuous arrangement at the same angle to said retainer and said bristles having a uniform pack density throughout the extent of the bristles from the fixed to the sealing end.

2. The brush seal of claim 1 in which said retainer includes a retainer element.

3. The brush seal of claim 1 in which said retainer includes a pair of spaced retainer elements with said bristles between them.

4. The brush seal of claim 1 in which said retainer includes a weld for attaching said bristles.

5. The brush seal of claim 1 in which said retainer includes a braze for attaching said bristles.

6. The brush seal of claim 1 in which said retainer is stainless steel.

7. The brush seal of claim 1 in which said retainer includes a back plate.

8. The brush seal of claim 1 in which said retainer includes a front plate.

9. The brush seal of claim 1 in which said retainer includes a flexible member.

10. The brush seal of claim 9 in which said flexible member has a moment of inertia of $5 \times 10^{-5}$ in$^4$ or less.

11. The brush seal of claim 1 in which said angle is between 30° and 90°.

12. The brush seal of claim 1 in which said retainer is linear.

13. The brush seal of claim 1 in which said retainer is curved.

14. The brush seal of claim 1 in which said retainer is annular.

15. The brush seal of claim 1 in which said bristles are a metal alloy.

16. The brush seal of claim 15 in which said bristles are a cobalt based metal alloy.

17. The brush seal of claim 15 in which said bristles are formed from a nickel-based metal alloy.

18. The brush seal of claim 1 in which said retainer is a metal alloy.

19. The brush seal of claim 18 in which said retainer is a nickel based metal alloy.

20. The brush seal of claim 18 in which said retainer formed from an iron-based metal alloy.

21. The brush seal of claim 11 in which said retainer is stainless steel.

22. An annular brush seal comprising:

an annular retainer; and a multiplicity of single radially extending bristles each having a fixed end and a free sealing end, said fixed ends being individually attached in a continuous array at the same angle to said retainer, said bristles having a uniform pack density throughout the radial extent of the bristles from the fixed end to the sealing end.

23. A linear brush seal comprising:

a linear retainer; and a multiplicity of single parallel bristles each having a fixed end and a free sealing end, said fixed ends being individually attached to said retainer at the same angle in a continuous array; said bristles having a uniform pack density throughout the parallel extending bristles from the fixed to the sealing end.

24. A brush seal comprising:

a curved retainer; and a multiplicity of single bristles each bristle having a fixed end and a free sealing end, said fixed ends being individually attached in a continuous arrangement at the same angle to said retainer and said bristles having a uniform pack density throughout the extent of the bristles from the fixed to the sealing end.

\* \* \* \* \*